(12) United States Patent
Yanagisawa et al.

(10) Patent No.: US 10,220,446 B2
(45) Date of Patent: Mar. 5, 2019

(54) METHOD FOR PRODUCING NICKEL POWDER

(71) Applicant: SUMITOMO METAL MINING CO., LTD., Tokyo (JP)

(72) Inventors: Kazumichi Yanagisawa, Kochi (JP); Junhao Zhang, Kochi (JP); Shin-ichi Heguri, Niihama (JP); Yoshitomo Ozaki, Niihama (JP); Kazuyuki Takaishi, Niihama (JP); Hideki Ohara, Niihama (JP); Tomoaki Yoneyama, Niihama (JP); Osamu Ikeda, Niihama (JP); Yohei Kudo, Niihama (JP)

(73) Assignee: Sumitomo Metal Mining Co., Ltd. (JP)

( * ) Notice: Subject to any disclaimer, the term of this patent is extended or adjusted under 35 U.S.C. 154(b) by 232 days.

(21) Appl. No.: 15/117,823

(22) PCT Filed: Feb. 17, 2015

(86) PCT No.: PCT/JP2015/054281
§ 371 (c)(1),
(2) Date: Aug. 10, 2016

(87) PCT Pub. No.: WO2015/122535
PCT Pub. Date: Aug. 20, 2015

(65) Prior Publication Data
US 2016/0368059 A1 Dec. 22, 2016

(30) Foreign Application Priority Data

Feb. 17, 2014 (JP) ................................. 2014-028902
Jul. 30, 2014 (JP) ................................. 2014-155511

(51) Int. Cl.
*B22F 9/26* (2006.01)
*B22F 9/24* (2006.01)

(52) U.S. Cl.
CPC .................. *B22F 9/24* (2013.01); *B22F 9/26* (2013.01); *B22F 2009/245* (2013.01); *B22F 2301/15* (2013.01); *B22F 2998/10* (2013.01); *B22F 2999/00* (2013.01)

(58) Field of Classification Search
CPC ........ B22F 9/24; B22F 9/26; B22F 2009/245; B22F 2301/15
See application file for complete search history.

(56) References Cited

U.S. PATENT DOCUMENTS 2,734,821 A    2/1956  Schaufelberger
2,805,139 A *  9/1957  McGauley .......... C22B 15/0063
                                            75/373

(Continued)

FOREIGN PATENT DOCUMENTS

JP    2005-505695    2/2005
JP    2005-510625    4/2005

(Continued)

OTHER PUBLICATIONS

"The manufacture and properties of metal powders produced by the gaseous reduction of aqueous solutions", Powder metallurgy, No. 1/2 (1958), pp. 40-52.

(Continued)

*Primary Examiner* — C Melissa Koslow
(74) *Attorney, Agent, or Firm* — Gerald E. Hespos; Michael J. Porco; Matthew T. Hespos

(57) ABSTRACT

Provided is a method for producing fine nickel powder used as suitable seed crystals for producing nickel powder from a solution containing a nickel ammine sulfate complex. The method for producing nickel powder sequentially comprises: a mixing step of adding, to a solution containing a nickel ammine sulfate complex, an insoluble solid which is insoluble in the solution to form a mixed slurry; a reduction and precipitation step of charging a reaction vessel with the (Continued)

mixed slurry and then blowing hydrogen gas into the mixed slurry in the reaction vessel to reduce nickel complex ions contained in the mixed slurry to form nickel precipitate on a surface of the insoluble solid; and a separation step of separating the nickel precipitate on the surface of the insoluble solid from the surface of the insoluble solid to form nickel powder.

7 Claims, 4 Drawing Sheets

(56) References Cited

U.S. PATENT DOCUMENTS

| | | |
|---|---|---|
| 3,399,050 A | 8/1968 | Evans et al. |
| 3,767,762 A | 10/1973 | Kunda |
| 2005/0211022 A1 | 9/2005 | Roche et al. |
| 2005/0268992 A1 | 12/2005 | Kagohashi et al. |

FOREIGN PATENT DOCUMENTS

| | | |
|---|---|---|
| JP | 4286220 | 4/2009 |
| JP | 2010-219363 | 9/2010 |
| JP | 2010-242143 | 10/2010 |
| WO | 2007/004664 | 1/2007 |

OTHER PUBLICATIONS

International Search Report.
Australian Office Action dated Sep. 9, 2016.

\* cited by examiner

METHOD FOR PRODUCING NICKEL POWDER

BACKGROUND

1. Field of the Invention.

The present invention relates to a method for producing fine nickel powder that can be utilized as seed crystals from a solution containing a nickel ammine sulfate complex, and particularly, the present invention can be applied to the treatment of an in-process intermediate solution generated from a nickel hydrometallurgical process.

2. Description of the Related Art.

Examples of known methods for producing fine nickel powder include dry methods such as an atomizing method of dispersing molten nickel in a gas or in water to obtain fine powder and a CVD method of volatilizing nickel and reducing it in a vapor phase to thereby obtain nickel powder as shown in Japanese Patent Laid-Open No. 2005-505695.

Further, examples of methods for producing nickel powder by a wet process include a method of producing nickel powder using a reducing agent as shown in Japanese Patent Laid-Open No. 2010-242143 and a spray pyrolysis method in which nickel powder is obtained by pyrolysis reaction by spraying a nickel solution into a reducing atmosphere at high temperatures as shown in Japanese Patent No. 4286220.

However, these methods are not economical because they require expensive reagents and a large amount of energy.

On the other hand, a method of obtaining nickel powder by feeding hydrogen gas into a nickel ammine sulfate complex solution to reduce nickel ions in the complex solution as shown in "The Manufacture and properties of Metal powder produced by the gaseous reduction of aqueous solutions", Powder metallurgy, No. 1/2 (1958), pp 40-52. is industrially inexpensive and useful. However, nickel powder particles obtained by this method are easily coarsened, and it has been difficult to produce fine powder that can be used as seed crystals.

Particularly, when particles are intended to be generated from an aqueous solution and grown, there is used a method of obtaining a powder having a predetermined particle size by allowing a small amount of fine crystals called seed crystals to coexist and feeding a reducing agent thereto to grow the seed crystals. Although seed crystals used in this method are obtained by grinding products in many cases, time and effort are required and the yield decreases, which leads to an increase in cost. Further, seed crystals having the best particle size and properties are not necessarily obtained by grinding. Thus, a method for stably obtaining seed crystals has been required.

In such a situation, the present invention provides a method for producing fine nickel powder used as suitable seed crystals for producing nickel powder from a solution containing a nickel ammine sulfate complex.

SUMMARY

A first aspect of the invention to solve such a problem is a method for producing nickel powder, sequentially comprising: a mixing step of adding, to a solution containing a nickel ammine sulfate complex, an insoluble solid which is insoluble in the solution to form a mixed slurry; a reduction and precipitation step of charging a reaction vessel with the mixed slurry and then blowing hydrogen gas into the mixed slurry while maintaining a pressure of a gas phase part in the reaction vessel at 1.0 to 4.0 MPa, to reduce nickel complex ions contained in the mixed slurry to form nickel precipitate on a surface of the insoluble solid; and a separation step of separating the nickel precipitate on the surface of the insoluble solid from the surface of the insoluble solid to form nickel powder.

A second aspect of the invention is a method for producing nickel powder according to the first aspect, wherein the concentration of ammonium sulfate in the solution containing a nickel ammine sulfate complex is in the range of 10 to 500 g/L.

A third aspect of the invention is a method for producing nickel powder according to the first and second aspects, wherein, in the reduction step, the temperature of the mixed slurry when hydrogen gas is blown is 150 to 200° C.

A fifth aspect of the invention is a method for producing nickel powder according to the first to third aspects, wherein the insoluble solid is one or a combination selected from among nickel, alumina, zirconia, iron, and silica.

The present invention can provide a method for producing the best fine nickel powder as seed crystals used for producing nickel powder more economically and efficiently from a nickel ammine sulfate complex solution using hydrogen gas.

DETAILED DESCRIPTION

The present invention provides a method for producing nickel powder, characterized by adding, to a nickel ammine sulfate complex solution, an insoluble solid which is insoluble in the solution or the insoluble solid and a dispersant to form a mixed slurry and then blowing hydrogen gas into the mixed slurry to thereby produce nickel powder.

Figure 1:
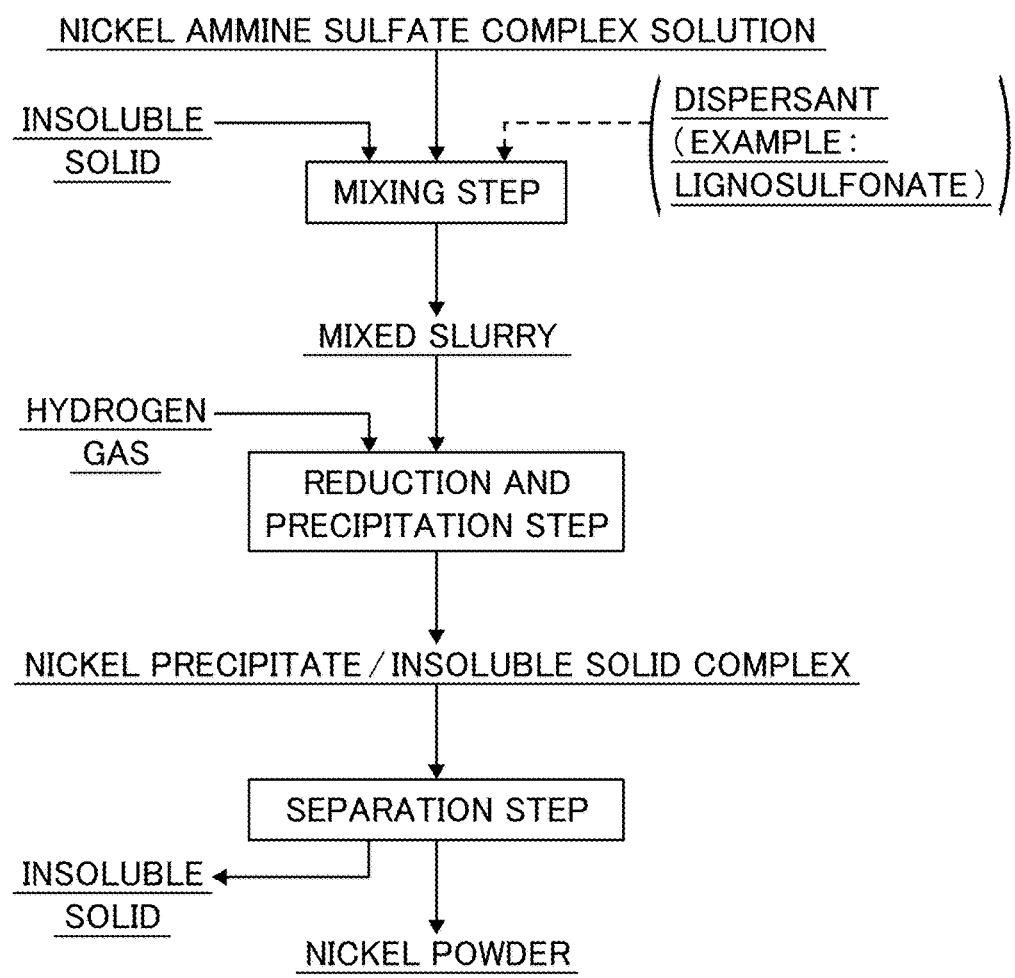
FIG. 1 is a production flow chart of the method for producing nickel powder according to the present invention.

Hereinafter, the method for producing nickel powder according to the invention will be described with reference to the production flow chart shown in FIG. 1.

[Nickel Aramine Sulfate Complex Solution]

Examples of a suitable nickel ammine sulfate complex solution used in the present invention include, but are not limited to, one obtained by dissolving a nickel-containing material such as an industrial intermediate comprising one or a mixture selected from nickel and cobalt mixed sulfide, coarse nickel sulfate, nickel oxide, nickel hydroxide, nickel carbonate, and nickel powder, with sulfuric acid or ammonia to obtain a nickel leaching solution (solution containing nickel), subjecting the nickel leaching solution to a purification step such as solvent extraction, ion exchange, and neutralization to obtain a solution from which impurity elements in the nickel leaching solution have been removed, and adding ammonia to the resulting solution to form a nickel ammine sulfate complex solution, in which nickel is contained in the form of nickel complex ions.

[Mixing Step]

In this step, a dispersant is first added to the nickel ammine sulfate complex solution prepared as described above, but an insoluble solid may be added to the nickel sulfate amine complex solution without adding a dispersant as described below.

A dispersant used here is not particularly limited as long as it contains a sulfonate, but lignosulfonate is suitable as a material that can be inexpensively obtained industrially.

Further, the concentration of ammonium sulfate in the solution is preferably in the range of 10 to 500 g/L. If the concentration exceeds 500 g/L, the solubility will be exceeded, and crystals will be precipitated. Further, since ammonium sulfate is newly produced by reaction, it is difficult to achieve a concentration of less than 10 g/L.

<Addition of Insoluble Solid>

To the nickel ammine sulfate complex solution prepared as described above or the nickel ammine sulfate complex solution in which a dispersant is added and adjusted, is added an insoluble solid which is insoluble in the complex solution and used as a matrix for precipitation.

The insoluble solid added here is not particularly limited as long as it is insoluble or has a low solubility in a nickel ammine sulfate complex solution, an aqueous ammonium sulfate solution, or an alkali solution, and examples thereof that can be used include nickel powder, iron powder, alumina powder, zirconia powder, and silica powder.

The present invention does not employ a conventional commonly-used method of using seed crystals to precipitate a powder and obtaining a product including the seed crystals. In the present invention, after the required precipitation (precipitation of nickel) on the surface of the insoluble solid has been completed, the powder (precipitate of nickel) which has been precipitated and grown is separated from the insoluble solid, and only the powder portion is used as a product. According to such a method of the present invention, the influence on the product caused by the properties as an impurity of the seed crystals themselves has can be avoided.

The amount of the insoluble solid added is not particularly limited, but the amount at which mixing by stirring can be achieved when the insoluble solid is added to the nickel ammine sulfate complex solution is selected depending on the type of the solid.

The shape and the size of the insoluble solid are not particularly limited. However, since the nickel powder precipitated on the surface may be separated by mutually colliding or applying vibration as will be described below, a suitable insoluble solid is that having a strength that endures impact and friction and a shape with a smooth surface so that nickel powder can be effectively separated.

Further, in terms of effective separation of nickel powder from the insoluble solid, for example, an insoluble solid having a diameter of about 0.1 to 3 mm and a shape with no edges such as spherical or elliptical is easy to use in real operation.

Preferably, the insoluble solid is used as an insoluble solid of the present invention after debris and the like on the surface of the insoluble solid is removed by giving collision and impact before nickel powder is precipitated.

Further, an insoluble solid from which nickel powder has been separated can also be repeatedly used again after being subjected to pretreatment such as washing as needed.

[Reduction and Precipitation Step]

Then, this step is a step of charging a reaction vessel resistant to high pressure and high temperature with the slurry formed by adding a dispersant and an insoluble solid in the previous step and blowing hydrogen gas into the slurry stored in the reaction vessel to reduce nickel complex ions in the slurry to precipitate nickel on the insoluble solid contained.

The temperature of the mixed slurry at this time, that is, reaction temperature, is preferably in the range of 150 to 200° C. If the reaction temperature is less than 150° C., reduction efficiency will be reduced, and even if it exceeds 200° C., the reaction will not be affected, but the loss of thermal energy will increase. Therefore, these temperatures are not suitable.

Further, the pressure of the gas phase part in the reaction vessel (this refers to a space part in the reaction vessel remaining after the solution is stored in the reaction vessel) during the reaction is preferably maintained at 1.0 to 4.0 MPa by feeding hydrogen gas. If the pressure is less than 1.0 MPa, reaction efficiency will be reduced, and even if it is higher than 4.0 MPa, the reaction will not be affected, but the loss of hydrogen gas will increase. In this regard, the nickel complex ions in the slurry can also be reduced if hydrogen gas is blown into the gas phase part in the reaction vessel instead of being blown into the mixed slurry.

By reduction and precipitation treatment under such conditions, a precipitate of nickel is formed on the insoluble solid and the nickel contained in the solution can be extracted and recovered as a precipitate of fine powdered nickel.

[Separation Step]

The nickel precipitate produced is in a state where it adheres to the insoluble solid and cannot be utilized in this state. Therefore, in this step, the nickel precipitate formed on the surface of the insoluble solid is separated from the insoluble solid and recovered as nickel powder.

Examples of specific separation methods of the nickel precipitate include a method of putting the whole insoluble solid and nickel precipitate in water so that the nickel precipitate is not oxidized by heat generation, rotating the insoluble solid to collide the insoluble solids with each other to separate nickel powder on the surface, a method of rotating the insoluble solid on a wet sieve to sift out separated nickel powder at the same time, and a method of applying an ultrasonic wave to a liquid to apply vibration to the insoluble solid to separate nickel powder. A sieve having an opening that is finer than the size of the insoluble solid can be used.

The nickel powder produced as described above can be used, for example, for nickel paste which is the internal constituent of multi-layer ceramic capacitors, and, in addition, can be used for producing high purity nickel metal by repeating the hydrogen reduction described above using the recovered nickel powder as seed crystals to thereby grow particles.

EXAMPLES

The present invention will be described below using Examples and Reference Examples.

Reference Example 1

[Mixing Step]

A solution containing a dispersant and a nickel ammine sulfate complex was prepared by adding 191 ml of 25% aqueous ammonia and 20 g of sodium lignosulfonate as the dispersant to a solution containing 75 g of nickel (nickel sulfate solution) and 330 g of ammonium sulfate and adjusting the total volume of the solution to 1000 ml.

To this solution, was added 300 g of nickel powder having an average particle size (D50) of 125 μm as an insoluble solid used as a matrix for precipitation followed by stirring to prepare a desired mixed slurry.
[Reduction and Precipitation Step]
Next, an inner cylinder of an autoclave was charged with the prepared mixed slurry; the mixed slurry was heated to 185° C. with stirring; hydrogen gas was blown into the mixed slurry while keeping the temperature; and hydrogen gas was further fed so as to maintain the pressure in the inner cylinder of the autoclave at 3.5 MPa. After a lapse of 140 minutes from the start of the feeding of hydrogen gas, the feeding of hydrogen gas was stopped, and the inner cylinder was cooled.
[Separation Step]
After cooling, the mixed slurry in the inner cylinder was filtered to remove the insoluble solid having nickel precipitate formed on the surface; the insoluble solid was then put in a wet sieve having an opening of 100 μm; and vibration was applied to the insoluble solid to separate the precipitated nickel powder from the insoluble solid as a matrix.

Figure 2:
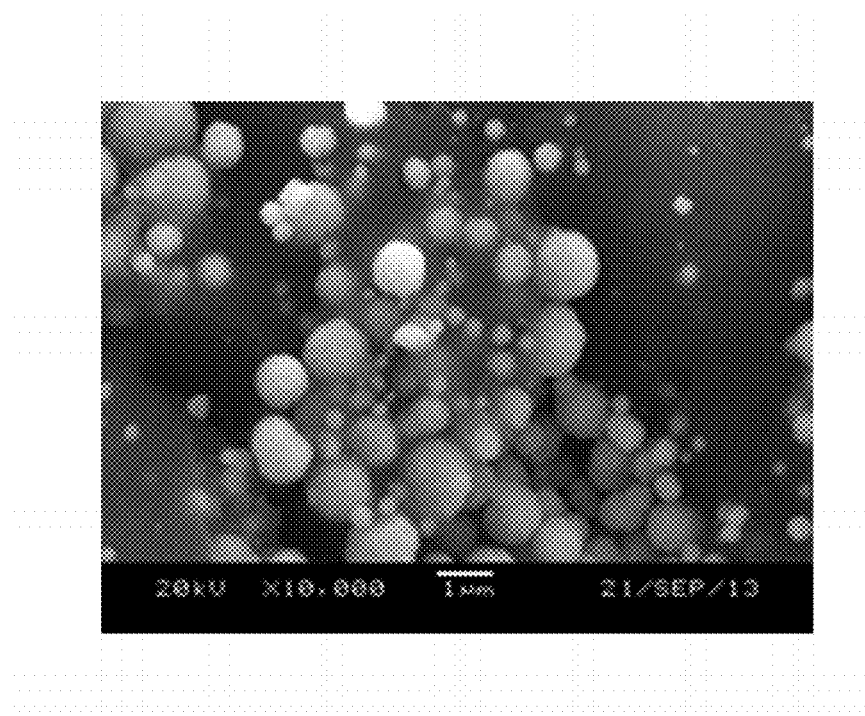
FIG. 2 is a SEM image showing the appearance of nickel powder produced in Reference Example 1.

When the recovered nickel powder was observed, it was verified that fine nickel powder was produced as shown in FIG. 2.

Reference Example 2

[Mixing Step]
A solution containing a dispersant and a nickel ammine sulfate complex was prepared by adding 191 ml of 25% aqueous ammonia and 10 g of sodium lignosulfonate as a dispersant to a solution containing 75 g of nickel (nickel sulfate solution) and 330 g of ammonium sulfate and adjusting the total volume of the solution to 1000 ml. To this solution, was added 75 g of zirconia balls each having a diameter of 1 mm as an insoluble solid used as a matrix for precipitation to prepare a mixed slurry.
[Reduction and Precipitation Step]
Next, an inner cylinder of an autoclave was charged with the mixed slurry; the mixed slurry was then heated to 185° C. with stirring; hydrogen gas was blown into the mixed slurry while keeping the temperature; and hydrogen gas was fed so as to maintain the pressure in the inner cylinder of the autoclave at 3.5 MPa. After a lapse of 65 minutes from the start of the feeding of hydrogen gas, the feeding of hydrogen gas was stopped, and the inner cylinder was cooled.
[Separation Step]
After cooling, the mixed slurry in the inner cylinder was filtered to remove the insoluble solid having nickel precipitate formed on the surface; the removed insoluble solid was then put in a wet sieve having an opening of 500 μm; and vibration was applied to the insoluble solid to separate the precipitated nickel powder from the insoluble solid as a matrix.

Figure 3:
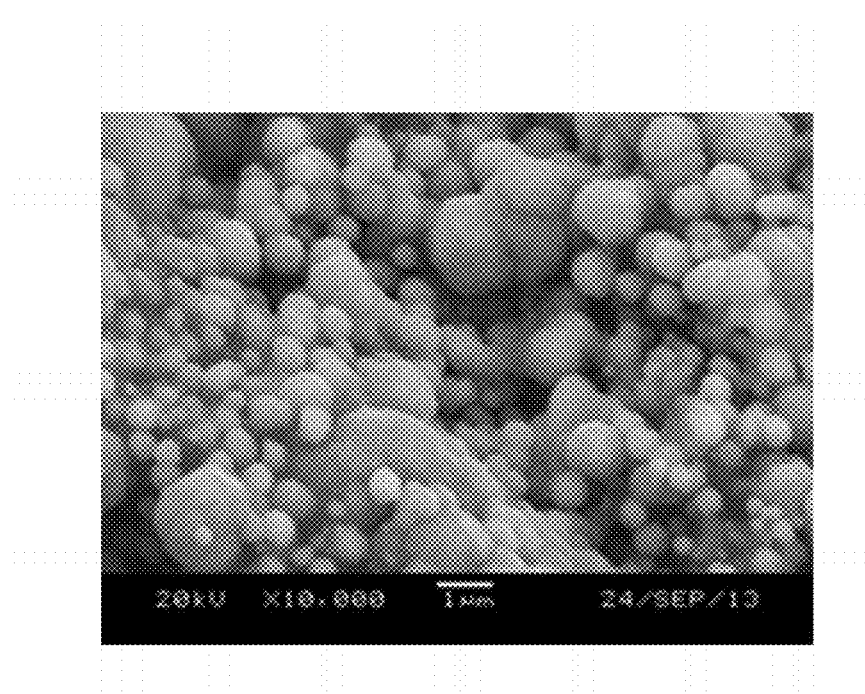
FIG. 3 is a SEM image showing the appearance of nickel powder produced in Reference Example 2.

When the recovered nickel powder was observed, it was verified that fine nickel powder was produced as shown in FIG. 3.

Comparative Example 1

[Separation Step]
A solution containing a dispersant and a nickel ammine sulfate complex was prepared by adding 191 ml of 25% aqueous ammonia and 5 g of sodium lignosulfonate as a dispersant to a solution containing 75 g of nickel (nickel sulfate solution) and 330 g of ammonium sulfate and adjusting the total volume of the solution to 1000 ml. The next operation was performed without adding an insoluble solid used as a matrix for precipitation to this solution.
[Reduction and Precipitation Step]
An inner cylinder of an autoclave was charged with the prepared solution; the solution was then heated to 185° C. with stirring; hydrogen gas was blown into the solution while keeping the temperature; and hydrogen gas was fed so as to maintain the pressure in the inner cylinder of the autoclave at 3.5 MPa. After a lapse of 60 minutes from the start of the feeding of hydrogen gas, the feeding of hydrogen gas was stopped, and the inner cylinder was cooled.
[Separation Step]
After cooling, the solution in the inner cylinder was filtered, but nickel powder could not be recovered, and plate-shaped scaling of nickel occurred on the side wall of the inner cylinder and on the stirrer.

Example 1

[Mixing Step]
A solution containing a nickel ammine sulfate complex was prepared by adding 13 ml of 25% aqueous ammonia to a solution containing 75 g of nickel (nickel sulfate solution) and 330 g of ammonium sulfate and adjusting the total volume of the solution to 1000 ml. To this solution, was added 5 g of electrolytic iron powder as a matrix for precipitation to prepare a mixed slurry.
[Reduction and Precipitation Step]
Next, an inner cylinder of an autoclave was charged with the mixed slurry; the mixed slurry was then heated to 185° C. with stirring; and hydrogen gas was blown into the mixed slurry for 10 minutes at a flow rate of 0.2 L/min while keeping the temperature. The pressure in the inner cylinder of the autoclave during the reaction showed 1.0 MPa. Subsequently, the feeding of hydrogen gas was stopped, and the inner cylinder was cooled.
[Separation Step]
After cooling, the slurry in the inner cylinder was filtered to remove the insoluble solid having nickel precipitate formed on the surface thereof, and nickel powder was recovered in the same manner as in Reference Example 1.

Figure 4:
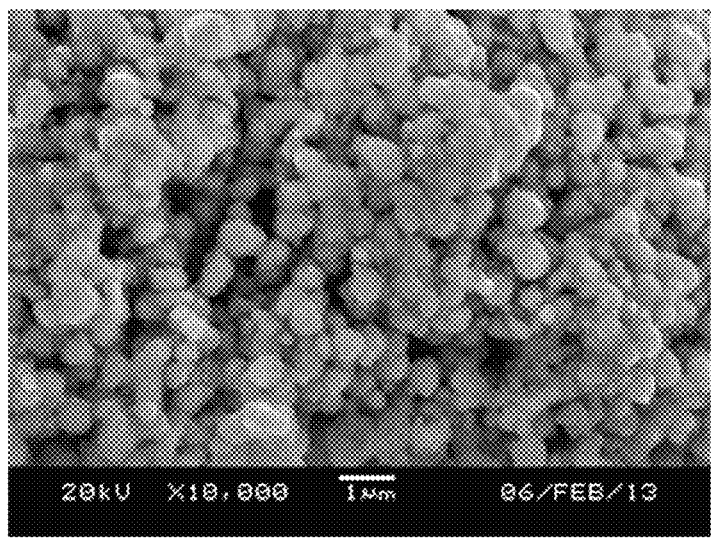
FIG. 4 is a SEM image showing the appearance of nickel powder produced in Example 1.

When the recovered powder was observed, it was verified that fine nickel powder was produced as shown in FIG. 4. Note that when FIG. 4 is compared with FIG. 2 in the case where a dispersant was added, the shape of nickel powder looks slightly non-uniform and rough, but there is practically no problem.

Reference Example 4

[Mixing Step]
A solution containing a nickel ammine sulfate complex was prepared by adding 191 ml of 25% aqueous ammonia and 5 g of sodium lignosulfonate as a dispersant to a solution containing 75 g of nickel (nickel sulfate solution) and 330 g of ammonium sulfate and adjusting the total volume of the solution to 1000 ml. To this solution, was added 75 g of alumina powder having a size of 200 meshes as an insoluble solid used as a matrix for precipitation to prepare a mixed slurry.
[Reduction and Precipitation Step]
Next, an inner cylinder of an autoclave was charged with the mixed slurry; the mixed slurry was then heated to 185° C. with stirring; hydrogen gas was blown into the mixed slurry while keeping the temperature; and hydrogen gas was fed so as to maintain the pressure in the inner cylinder of the autoclave at 3.5 MPa. After a lapse of 90 minutes from the start of the feeding of hydrogen gas, the feeding of hydrogen gas was stopped, and the inner cylinder was cooled.

[Separation Step]

After cooling, the slurry in the inner cylinder was filtered to remove the insoluble solid having nickel precipitate formed on the surface thereof, and nickel powder was recovered in the same manner as in Reference Example 1.

Figure 5:
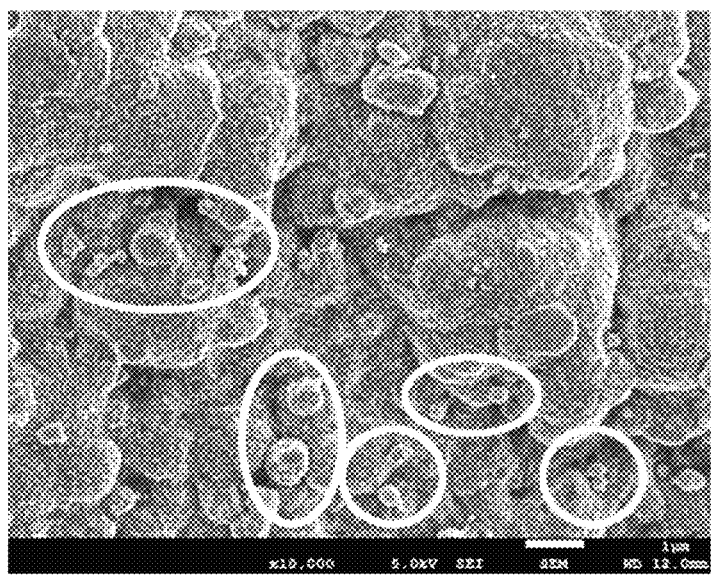
FIG. 5 is a SEM image showing the appearance of nickel powder produced in Reference Example 4.

When the recovered powder was observed, it was verified that fine nickel powder was produced on alumina as a matrix as shown in FIG. 5. (The places where nickel powder was produced were shown by enclosing them with circles.)

Reference Example 5

[Mixing Step]

A solution containing a nickel ammine sulfate complex was prepared by adding 191 ml of 25% aqueous ammonia and 5 g of sodium lignosulfonate as a dispersant to a solution containing 75 g of nickel (nickel sulfate solution) and 330 g of ammonium sulfate and adjusting the total volume of the solution to 1000 ml. To this solution, was added 75 g of silica powder having a D50 of 38 μm as an insoluble solid used as a matrix for precipitation to prepare a mixed slurry.

[Reduction and Precipitation Step]

Next, an inner cylinder of an autoclave was charged with the mixed slurry; the mixed slurry was then heated to 185° C. with stirring; hydrogen gas was blown into the mixed slurry while keeping the temperature; and hydrogen gas was fed so as to maintain the pressure in the inner cylinder of the autoclave at 3.5 MPa. After a lapse of 90 minutes from the start of the feeding of hydrogen gas, the feeding of hydrogen gas was stopped, and the inner cylinder was cooled.

[Separation Step]

After cooling, the slurry in the inner cylinder was filtered to remove the insoluble solid having nickel precipitate formed on the surface, and nickel powder was recovered in the same manner as in Reference Example 1.

Figure 6:
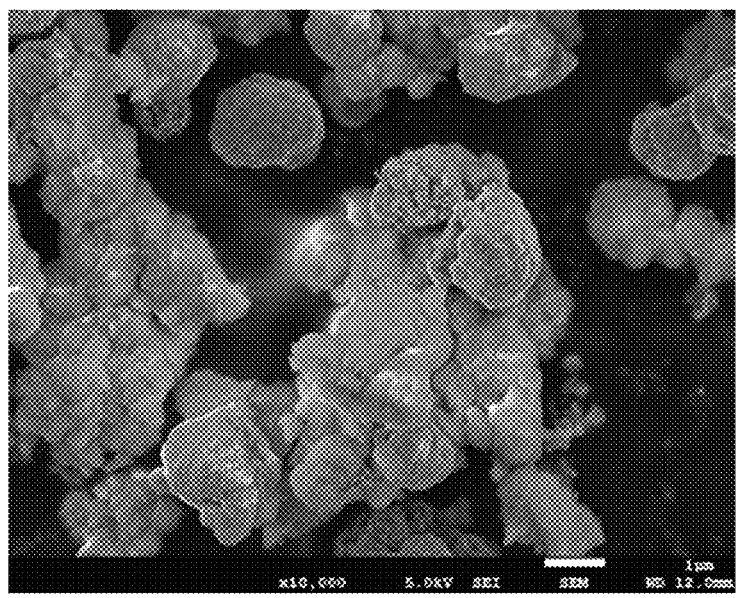
FIG. 6 is a SEM image showing the appearance of nickel powder produced in Reference Example 5.

When the recovered powder was observed, it was verified that fine nickel powder was produced as shown in FIG. 6.

The invention claimed is:

1. A method for producing nickel powder, sequentially comprising:
    a mixing step of adding, to a solution containing a nickel ammine sulfate complex, an insoluble solid that is insoluble in the solution to form a mixed slurry, the insoluble solid having a shape with a smooth surface, and the mixing step being carried out without adding a dispersant;
    a reduction and precipitation step of charging a reaction vessel with the mixed slurry and then blowing hydrogen gas into the mixed slurry while maintaining a pressure of a gas phase part in the reaction vessel at 1.0 to 4.0 MPa, to reduce nickel complex ions contained in the mixed slurry to form nickel precipitate on a surface of the insoluble solid; and
    a separation step of separating the nickel precipitate on the surface of the insoluble solid from the surface of the insoluble solid to form nickel powder.

2. The method for producing nickel powder according to claim 1, wherein ammonium sulfate included in the solution containing a nickel ammine sulfate complex has a concentration of 10 to 500 g/L.

3. The method for producing nickel powder according to claim 2, wherein, in the reduction step, the mixed slurry when the hydrogen gas is blown has a temperature of 150 to 200° C.

4. The method for producing nickel powder according to claim 3, wherein the insoluble solid is one or a combination selected from among nickel, alumina, zirconia, iron, and silica.

5. The method for producing nickel powder according to claim 1, wherein, in the reduction step, the mixed slurry when the hydrogen gas is blown has a temperature of 150 to 200° C.

6. The method for producing nickel powder according to claim 5, wherein the insoluble solid is one or a combination selected from among nickel, alumina, zirconia, iron, and silica.

7. The method for producing nickel powder according to claim 1, wherein the insoluble solid is one or a combination selected from among nickel, alumina, zirconia, iron, and silica.

* * * * *